(12) United States Patent
Kwon

(10) Patent No.: US 10,930,944 B2
(45) Date of Patent: Feb. 23, 2021

(54) EVAPORATIVE COOLING TYPE FUEL CELL SYSTEM AND COOLING CONTROL METHOD FOR THE SAME

(71) Applicants: Hyundai Motor Company, Seoul (KR); Kia Motors Corporation, Seoul (KR)

(72) Inventor: Hyuck-Roul Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

(21) Appl. No.: 16/274,783

(22) Filed: Feb. 13, 2019

(65) Prior Publication Data

US 2019/0181463 A1 Jun. 13, 2019

Related U.S. Application Data

(62) Division of application No. 15/296,691, filed on Oct. 18, 2016, now Pat. No. 10,263,266.

(30) Foreign Application Priority Data

Mar. 11, 2016 (KR) ........................ 10-2016-0029561

(51) Int. Cl.
*H01M 8/04007* (2016.01)
*H01M 8/04828* (2016.01)
*H01M 8/04119* (2016.01)
*H01M 8/04746* (2016.01)
*H01M 8/04701* (2016.01)

(52) U.S. Cl.
CPC ... *H01M 8/04059* (2013.01); *H01M 8/04067* (2013.01); *H01M 8/04134* (2013.01); *H01M 8/04701* (2013.01); *H01M 8/04753* (2013.01); *H01M 8/04768* (2013.01); *H01M 8/04835* (2013.01); *H01M 8/04164* (2013.01);
(Continued)

(58) Field of Classification Search
None
See application file for complete search history.

(56) References Cited

U.S. PATENT DOCUMENTS

2004/0191585 A1\* 9/2004 Morita .............. H01M 8/04067
429/413
2007/0082245 A1 4/2007 Druenert
(Continued)

FOREIGN PATENT DOCUMENTS

JP H10247505 A 9/1998
JP 2002-280046 A 9/2002
(Continued)

*Primary Examiner* — Scott J. Chmielecki
(74) *Attorney, Agent, or Firm* — Mintz Levin Cohn Ferris Glovsky and Popeo, P.C.; Peter F. Corless

(57) ABSTRACT

An evaporative cooling type fuel cell system and a cooling control method for the same are provided. The fuel cell system includes a stack that generates electric power by reacting hydrogen as fuel with air as an oxidant. The method includes adjusting an operation pressure of the stack based on a current operation temperature of the stack and adjusting the amount of water supplied to the stack from a water reservoir based on the current operation temperature. The water is supplied to a cathode of the stack. Thus, a compact-simplified fuel cell system is provided, thereby reducing manufacturing costs and weight.

8 Claims, 7 Drawing Sheets

(52) U.S. Cl.
CPC .......... *H01M 2250/20* (2013.01); *Y02P 70/50* (2015.11); *Y02T 90/40* (2013.01)

(56) References Cited

U.S. PATENT DOCUMENTS

| | | | |
|---|---|---|---|
| 2008/0206608 A1* | 8/2008 | Lienkamp | H01M 8/04029 429/444 |
| 2009/0126902 A1* | 5/2009 | Choe | H01M 8/04007 165/41 |
| 2010/0086812 A1 | 4/2010 | Pasera et al. | |
| 2012/0058404 A1* | 3/2012 | Ishikawa | H01M 8/04544 429/413 |
| 2012/0258375 A1* | 10/2012 | Fukuma | H01M 8/0267 429/413 |
| 2012/0301799 A1* | 11/2012 | Markoski | H01M 8/04141 429/414 |
| 2013/0189596 A1* | 7/2013 | Kawahara | H01M 8/04313 429/413 |
| 2014/0093796 A1* | 4/2014 | Aoki | H01M 8/04395 429/413 |
| 2014/0134508 A1* | 5/2014 | Ishikawa | H01M 8/04253 429/430 |
| 2015/0207158 A1* | 7/2015 | Nanba | H01M 8/04067 429/442 |
| 2015/0311543 A1* | 10/2015 | Matsusue | H01M 8/04753 429/434 |
| 2016/0036072 A1* | 2/2016 | Han | H01M 8/04225 429/413 |
| 2016/0049708 A1 | 2/2016 | Kuwabara | |
| 2016/0056517 A1 | 2/2016 | Han et al. | |
| 2016/0133971 A1* | 5/2016 | Naganuma | H01M 8/0432 429/434 |
| 2016/0141692 A1 | 5/2016 | Barnard et al. | |
| 2016/0181637 A1* | 6/2016 | Nanba | H01M 8/04694 429/437 |
| 2018/0062186 A1* | 3/2018 | Jahnke | F28B 9/08 |
| 2018/0241060 A1* | 8/2018 | Harbusch | H01M 8/0606 |

FOREIGN PATENT DOCUMENTS

| | | |
|---|---|---|
| JP | 2005-100693 A | 4/2005 |
| JP | 2008-147076 A | 6/2008 |
| JP | 2013-080718 A | 5/2013 |
| KR | 2006-0068172 A | 6/2006 |
| KR | 2007-0048917 A | 5/2007 |
| KR | 10-0986525 B1 | 10/2010 |
| KR | 2011-0077472 A | 7/2011 |
| KR | 10-2014-0058961 A | 5/2014 |
| KR | 2014-0058961 A | 5/2014 |

* cited by examiner

EVAPORATIVE COOLING TYPE FUEL CELL SYSTEM AND COOLING CONTROL METHOD FOR THE SAME

CROSS-REFERENCE TO RELATED APPLICATION(S)

This application is a divisional of U.S. patent application Ser. No. 15/296,691 filed on Oct. 18, 2016 which claims the benefit of priority to Korean Patent Application No. 10-2016-0029561, filed on Mar. 11, 2016, which is hereby incorporated by reference as if fully set forth herein.

BACKGROUND

Field of the Invention

The present invention relates to a fuel cell system and a cooling control method for the same, and more particularly, to an evaporative cooling type fuel cell system and a cooling control method for the same, capable of cooling a stack in the fuel cell system and humidifying air supplied to a vehicle by adjusting the amount and pressure of air in a cathode based on a stack temperature in the fuel cell system.

Discussion of the Related Art

A fuel cell system is a type of electric power generator, which electrochemically converts chemical energy of fuel directly into electric energy in a fuel cell stack, instead of converting the chemical energy into heat by combustion. Such a fuel cell system mainly includes a fuel cell stack configured to generate electric energy, a hydrogen supply unit configured to supply hydrogen as a fuel to the fuel cell stack, an air (oxygen) supply unit configured to supply oxygen of air as an oxidant required for electrochemical reaction in the fuel cell stack, a thermal management system (TMS) configured to discharge reaction heat from the fuel cell stack to outside fuel cell system, adjust operation temperature of the fuel cell stack, and perform a water management function, and a system controller configured to execute overall operation of the fuel cell system.

The fuel cell system generates electricity by reacting hydrogen as a fuel with oxygen of air. In particular, the fuel cell system generates heat and water as reaction byproducts. The most attractive fuel cell type is an ion exchange membrane fuel cell or a polymer electrolyte membrane fuel cell (PEMFC), which has the highest power density among known fuel cells. The PEMFC is operated at a low temperature to allow a vehicle to be started in a short amount of time. In addition, the PEMFC may have a rapid response time for power conversion.

The fuel cell stack of the PEMFC includes a membrane electrode assembly (MEA), a gas diffusion layer (GDL), gaskets, fasteners, and a bipolar plate. The MEA includes a polymer electrolyte membrane where hydrogen ions are transferred therethrough and electrode/catalyst layers respectively adhered to both sides of the polymer electrolyte membrane. In particular, in the electrode/catalyst layers, electrochemical reaction occurs. The GDL functions to uniformly distribute reactant gases and transfer generated electricity. The gaskets and the fasteners maintain an appropriate airtightness to the reactant gases and coolant and an appropriate fastening pressure. The bipolar plate transfers the reactant gases and coolant. The fuel cell generates current using a fuel cell reaction when hydrogen and oxygen (air) are supplied.

In the fuel cell stack, hydrogen is supplied to an anode, as a positive electrode (or "fuel electrode"), and oxygen (air) is supplied to a cathode, as a negative electrode (or "air electrode" or "oxygen electrode"). The hydrogen supplied to the anode is dissociated into hydrogen ions (protons, H$^+$) and electrons (e$^-$) by a catalyst of the electrode layers adhered to both sides of the polymer electrolyte membrane. Only hydrogen ions selectively migrate to the cathode through the polymer electrolyte membrane as a cation exchange membrane. Simultaneously, the electrons are transferred to the cathode through the GDL and the bipolar plate. In particular, at the cathode, the hydrogen ions supplied through the polymer electrolyte membrane and the electrons transferred through the bipolar plate react with oxygen of air supplied to the cathode through an air supply device, to produce water.

A hydrogen ion flow causes an electron flow through an external conductive wire and then, the electron flow generates a current. In addition, heat is generated in a reaction of generating water. The electrode reactions in the PEMFC may be represented by the following formulas:

$2H_2 \rightarrow 4H^+ + 4e^-$  [Reaction in fuel electrode]

$O_2 + 4H^+ + 4e^- \rightarrow 2H_2O$  [Reaction in air electrode]

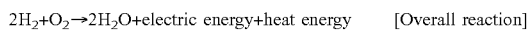
$2H_2 + O_2 \rightarrow 2H_2O + \text{electric energy} + \text{heat energy}$  [Overall reaction]

In the above reaction, the hydrogen ions pass through the polymer electrolyte membrane, and membrane permeability of hydrogen is determined by a function of water amount. Further, as the above reaction proceeds, water is produced, thereby humidifying the reactant gases and the polymer electrolyte membrane.

When a gas is dry, the overall quantity of water produced by the reaction is used to humidify air causing the polymer electrolyte membrane to dry. For appropriate operation of the fuel cell, the polymer electrolyte membrane is maintained moist since membrane permeability of hydrogen is determined by a function of water amount contained in the polymer electrolyte membrane. When the polymer electrolyte membrane is too wet, pores of the GDL are clogged preventing the reactant gases from contacting the catalyst. Accordingly, an appropriate water amount of the polymer electrolyte membrane should be maintained. Further, as an oxidant, ambient air, instead of pure oxygen, is provided to the fuel cell. However, air humidity of ambient air is insufficient to moisten the polymer electrolyte membrane. Accordingly, air should be humidified before being supplied to the fuel cell for appropriate operation of the fuel cell.

Meanwhile, the fuel cell stack has a structure in which a plurality of unit cells are stacked repeatedly. The unit cell is a minimum fuel cell element where hydrogen reacts with oxygen to generate electric energy. The unit cell has a structure in which a bipolar plate, a GDL and an MEA are stacked. The bipolar plate is a core part of the fuel cell, which has various functions such as structurally supporting the MEA and the GDL, collecting and transferring generated current, transferring reactant gases, transferring and removing reaction byproducts, transferring coolant to remove reaction heat, and so on.

As a conventional art related to cooling and humidifying a fuel cell stack discloses that a porous bipolar plate is used to provide system cooling by coolant, reactant humidification and condensate collection. Another related art discloses a fuel cell system and a cooling control method for the same. In particular, water evaporation and water condensation only using air necessary for the fuel cell system are adjusted by adjusting each pressure and each temperature of a cooling channel, a radiator and a cathode. Heat generated from the stack may be radiated and air necessary for reaction may be appropriately humidified.

SUMMARY

Accordingly, the present invention provides an evaporative cooling type fuel cell system and a cooling control method for the same that substantially obviates one or more problems due to limitations and disadvantages of the related art. An object of the present invention is to provide an evaporative cooling type fuel cell system and a cooling control method for the same, which may cool a stack by adjusting the amount and pressure of air in a cathode in accordance with an operation temperature of the stack, and humidify air supplied to a vehicle. Another object of the present invention is to provide an evaporative cooling type fuel cell system and a cooling control method for the same, which may adaptively adjust an outlet pressure of a radiator based on the amount of condensate to be recovered by the radiator.

Still another object of the present invention is to provide an evaporative cooling type fuel cell system and a cooling control method for the same, which may adjust the amount and pressure of air in a stack and an outlet pressure of a radiator to satisfy desired output power of the fuel cell system. Still another object of the present invention is to provide an evaporative cooling type fuel cell system and a cooling control method for the same, which may adaptively adjust the amount and pressure of air in a stack and an outlet pressure of a radiator to maximize efficiency of the fuel cell system.

Additional advantages, objects, and features of the exemplary embodiments will be set forth in part in the description which follows and in part will become apparent to those having ordinary skill in the art upon examination of the following or may be learned from practice of the exemplary embodiments. The objectives and other advantages of the exemplary embodiments may be realized and attained by the structure particularly pointed out in the written description and claims hereof as well as the appended drawings.

To achieve these objects and other advantages and in accordance with the purpose of the exemplary embodiments, as embodied and broadly described herein, a cooling control method in a fuel cell system including a stack to generate electric power by reacting hydrogen as fuel with air as an oxidant, may include adjusting an operation pressure of the stack based on a current operation temperature of the stack, and adjusting an amount of water supplied from a water reservoir to the stack based on the current operation temperature of the stack, wherein water is supplied to a cathode of the stack.

The operation temperature of the stack may be adjusted by adjusting the air amount supplied to the cathode and an operation pressure of a radiator. The cooling control method may further include limiting output power of the stack when the current operation temperature of the stack is equal to or greater than a predetermined upper temperature limit. Additionally, the cooling control method may include decreasing the operation pressure of the stack and increasing the amount of water supplied to the stack when the current operation temperature is equal to or greater than a predetermined upper operation temperature limit of the stack and the water level of the water reservoir is equal to or greater than a predetermined lower water level limit of the water reservoir.

The amount of water supplied to the stack may be increased in proportion to a difference between the current operation temperature and the predetermined upper operation temperature limit of the stack. The cooling control method may further include limiting output power of the stack when the operation temperature is equal to or greater than a predetermined upper operation temperature limit of the stack and the water level of the water reservoir is less than a predetermined lower water level limit of the water reservoir. Additionally, before limiting output power of the stack, at least one of the operation pressure of the stack and the amount of water supplied to the cathode may be adjusted based on a water level of the water reservoir.

Further, the cooling control method further include maintaining the amount of water supplied to the stack when the current operation temperature is within a range of a predetermined operation temperature of the stack and decreasing the amount of water supplied to the stack when the current operation temperature is equal to or less than the range of the operation temperature of the stack. Additionally, the cooling control method may include maintaining an operation pressure of the radiator supplying condensate to the water reservoir and an air stoichiometric ratio (SR) corresponding to air amount supplied to the cathode when the water level of the water reservoir is within a range of a predetermined target water level of the water reservoir and decreasing the operation pressure of the radiator when the water level of the water reservoir is greater than the predetermined target water level of the water reservoir. The amount of condensate supplied to the water reservoir may be decreased when the operation pressure of the radiator is decreased.

The cooling control method may further include performing at least one of increasing the operation pressure of the radiator, decreasing the air SR, and limiting output power of the stack, when the water level of the water reservoir is equal to or less than the predetermined target water level of the water reservoir. The operation pressure of the radiator may be maintained and the air SR may be increased when the water level of the water reservoir is greater than the predetermined target water level of the water reservoir.

In another aspect of the present invention, a fuel cell system including a stack to generate electric power by reacting hydrogen as fuel with air as an oxidant may include a first valve configured to exhaust air from the fuel cell system, a second valve configured to adjust an amount of air supplied to a cathode of the stack, a first compressor configured to adjust a pressure of air introduced into the second valve to supply air to the stack, a second compressor configured to adjust a pressure of air exhausted from the stack, and a radiator configured to radiate heat of the exhausted air transferred from the second compressor to generate condensate to be supplied to the stack and air to be exhausted by the first valve.

At least one of the second valve and the first and second compressors may be configured to adjust an operation pressure of the stack. The condensate amount generated in the radiator may be adjusted by adjusting an operation pressure of the radiator. The operation pressure of the radiator may be adjusted by adjusting at least one of the second compressor and the first valve.

The fuel cell system may further include a water reservoir configured to store condensate to be supplied to the stack, wherein at least one of an operation pressure of the stack, an operation pressure of the radiator, and an air SR corresponding to air amount supplied to the cathode may be dynamically adjusted, to maintain a water level of the water reservoir within a range of a predetermined target water level. Additionally, output power may be limited when the water level of the water reservoir is equal to or less than the range of the predetermined target water level. Operation pressures of the stack and radiator may be dynamically adjusted based on desired output power of the stack. At least one of air amount, an operation pressure of the stack and an operation pressure of the radiator may be dynamically adjusted to minimize power consumed by the first and second compressors and to maximize output power of the stack.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a better understanding of the invention and are incorporated in and constitute a part of this application, illustrate exemplary embodiment(s) of the invention and together with the description serve to explain the principle of the invention. In the drawings.

DETAILED DESCRIPTION

Figure 1:
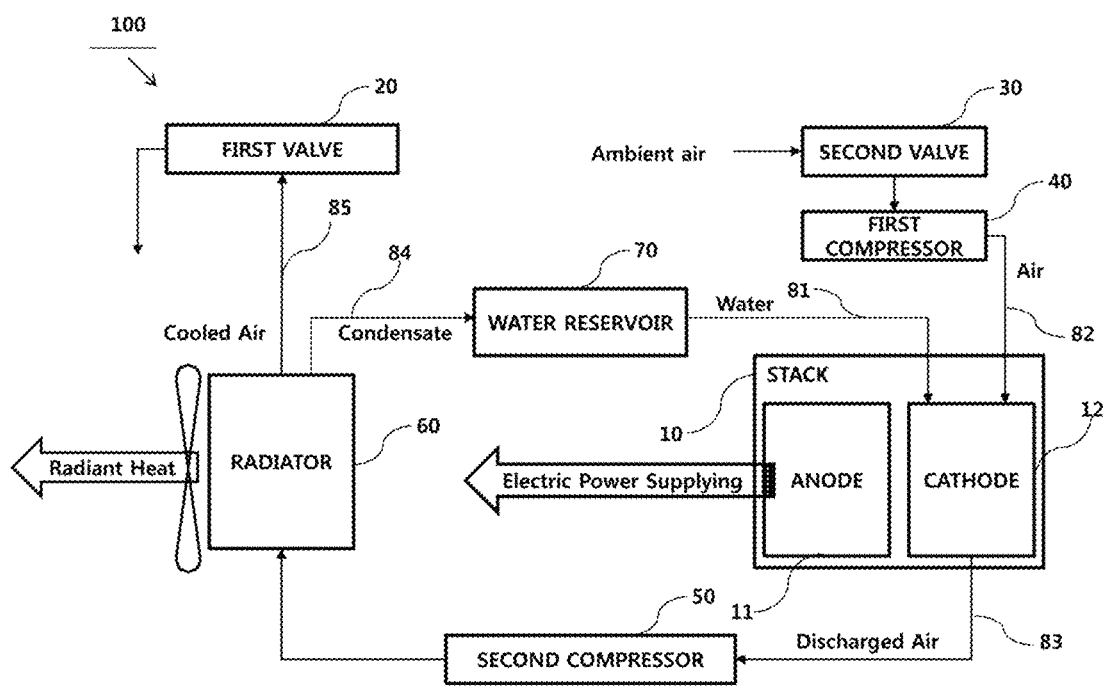
FIG. 1 is a block diagram illustrating a fuel cell system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. The suffixes "module" and "unit" of elements herein are used for convenience of description and thus can be used interchangeably and do not have any distinguishable meanings or functions.

Although all elements constituting the embodiments of the present invention are described as being integrated into a single one or operated as a single one, the present invention is not necessarily limited to such exemplary embodiments. According to exemplary embodiments, all of the elements may be selectively integrated into one or more and be operated as one or more within the object and scope of the present invention. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present invention pertains. The computer program may be stored in computer readable media such that the computer program is read and executed by a computer to implement embodiments of the present invention. Computer program storage media may include magnetic recording media, optical recording media, and carrier wave media.

"All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless obviously defined in the present invention, such terms are not interpreted as having ideal or excessively formal meanings.

It will be understood that, although the terms first, second, A, B, (a), (b), etc. may be used herein to describe various elements of the present invention, these terms are only used to distinguish one element from another element and intrinsic nature, order, or sequence of corresponding elements are not limited by these terms. It will be understood that when one element is referred to as being "connected to", "coupled to", or "accessed by" another element, one element may be "connected to", "coupled to", or "accessed by" another element via a further element although one element may be directly connected to or directly accessed by another element.

FIG. 1 is a block diagram illustrating a fuel cell system according to an exemplary embodiment of the present invention of the present invention. Referring to FIG. 1, the fuel cell system, which is designated by reference numeral "100", may include a stack 10, a first valve 20, a second valve 30, a first compressor 40, a second compressor 50, a radiator 60, and a water reservoir 70. The fuel cell system 100 may further include a fuel cell system controller (not shown) configured to operate above-described components through electrical control signals.

For example, the controller may be configured to receive signals related to stack power, current, voltage, air flow rate, ambient air temperature/pressure, cathode discharged air temperature/pressure, water supply rate (81), radiator cooled air temperature/pressure, water reservoir level, user power requirement and radiator fan revolutions per minute (rpm) from the first/second valve, first/second compressor, water reservoir, fuel cell stack and various sensors. Additionally, the controller may be configured to transmit a first/second valve open angle command, first/second compressor speed (rpm) command, water supply rate command (81) to first/second valve, first/second compressor and water reservoir.

The stack 10 may include a positive electrode, namely, an anode 11, and a negative electrode, namely, a cathode 12. Furthermore, the stack 10 may generate electric energy and water vapor based on a water generation reaction between the anode and the cathode. In particular, the electric energy generated in the stack 10 may be output through the anode 11. As shown in FIG. 1, the fuel cell system 100 according to the illustrated exemplary embodiment of the present invention may be configured to supply water for cooling heat generated in the stack 10 through a water supply line 81 to the cathode 12 while supplying air as an oxidant for water generation reaction through an air supply line 82 to the cathode 12.

Particularly, the amount and pressure of air introduced into the cathode 12 may be respectively adjusted by the second valve 30 and a first compressor 40. The amount and pressure of the introduced air may be adjusted based on a target operation temperature of the stack 10 (e.g., about less than 120° C.) in the fuel cell system 100. Heat generated by water generation reaction in the stack 10 evaporates water supplied through the water supply line 81 to the cathode 12, thereby generating water vapor. In addition, latent heat of evaporation of the generated water vapor causes the stack 10 to be cooled and high-temperature water vapor may also be generated by water generation reaction in the stack 10.

The high-temperature water vapor generated in the stack 10 may be transferred to the second compressor 50 via an air discharge line 83 connected to one side (e.g., a first side) of the cathode 12. In particular, water vapor discharged through an air discharge line 82 may be in a nearly saturated state. Evaporation latent heat of water may be about 2,300 kJ/kg at 80 degrees Celsius. Evaporation latent heat requires a substantial amount of heat compared to sensible heat.

As an internal temperature of the stack 10 is increased and an internal pressure of the stack 10 is decreased, evaporation of water in the stack 10 is increased. In addition, the amount of evaporable water vapor in air supplied to the cathode 12 of the stack 10 is also increased as an internal temperature of the cathode 12 is increased and an internal pressure of the cathode 12 is decreased. Accordingly, for improved evaporation of water supplied to the cathode 12, the internal temperature of the cathode 12 is high and the internal pressure of the cathode 12 is low. For high performance of the stack 10, however, the internal temperature and internal pressure of the cathode 12 should be appropriately maintained.

In an exemplary embodiment, the internal pressure of the cathode 12 may be adjusted by operating the first and second compressors 40 and 50. In another exemplary embodiment, the internal pressure of the cathode 12 may be adjusted by operating the second valve 30 and the first and second compressors 40 and 50. A pressure of high-temperature and high-humidity water vapor supplied to the radiator 60 may be adjusted by the second compressor 50. The radiator 60 may be configured to radiate heat of the high-temperature and high-humidity water vapor to generate condensed water. In particular, an internal temperature of the radiator 60 may increase and an internal pressure of the radiator 60 may decrease due to the radiation. Accordingly, absolute humidity of the radiator 60 may decrease, thereby condensing water vapor into water.

The amount of water condensed by the radiator 60 (hereinafter, for the sake of brevity, referred to as condensate) may be adjusted by adjusting a total outlet pressure of the radiator 60 based on an outlet temperature and air amount in the radiator 60. The total outlet pressure of the radiator 60 may be adjusted by the second compressor 50 and the first valve 20.

Particularly, the outlet temperature and air amount in the radiator 60 may be determined based on ambient temperature and the amount of absolute heat to be radiated. Further, the amount of water vapor discharged through the first valve 20 (e.g., the amount of water vapor supplied to the radiator 60—the amount of water condensed by the radiator 60) may be adjusted by adjusting the total outlet pressure of the radiator 60 based on a determined outlet temperature and a determined air amount in the radiator 60. In other words, the humidity in a vehicle, in which the fuel cell system is installed, may be adjusted by adjusting the total outlet pressure of the radiator 60 using the second compressor 50 and the first valve 20.

In the radiator 60, as the air amount is decreased, the internal temperature is decreased, and the internal pressure is increased, the amount of the condensate may be increased. The condensate of the radiator 60 may be transferred to the water reservoir 70 through a separate condensate line 84 disposed at one side (e.g., a first side) of the outlet of the radiator 60. This is merely an illustrative exemplary embodiment, and the method of transferring condensate from the radiator 60 to the water reservoir 70 is not limited thereto. In an exemplary embodiment, a drain pump may be further disposed at the radiator 60 to transfer condensate to the water reservoir 70 via the condensate line 84. In another exemplary embodiment, condensate may be transferred to the water reservoir 70 via the condensate line 84 through pressure control by the second compressor 50.

Cooled air discharged through the outlet of the radiator 60 may be humid air having a greater or less amount of water vapor. In addition, after being transferred to the first valve 20 via a radiator discharge line 85, cooled air may be exhausted from the fuel cell system 100. Particularly, in the fuel cell system 100 according to illustrated exemplary embodiment of the present invention, the water vapor amount contained in ambient air introduced through the second valve 30 may be equalized with the water vapor amount contained in air discharged through the first valve 20. When the water vapor amount discharged through the first valve 20 is greater than the water vapor amount introduced through the second valve 30, the water amount stored in the water reservoir 70 may be gradually decreased thus causing supply of an insufficient amount of water to the cathode 12, thereby increasing the internal temperature of the stack 10.

Further, as the water vapor amount contained in ambient air introduced through the second valve 30 is equalized with the water vapor amount contained in air discharged through the first valve 20, it may be possible to prevent inconvenience of having to add water to the water reservoir 70 while maintaining desired performance of the fuel cell system. Thus, the fuel cell system 100 according to the illustrated exemplary embodiment of the present invention may adaptively (dynamically) operate at least one of the first and second valves 20 and 30, and the first and second compressors 40 and 50 based on characteristics of ambient air, the target operation temperature of the stack 10, the target amount of output power of the stack 10, and so on, thereby maintaining desired performance of the fuel cell system.

The fuel cell system 100 according to the illustrated exemplary embodiment of the present invention may equalize the water vapor amount of ambient air introduced through the second valve 30 with the water vapor amount of air discharged through the first valve 20, thereby maintaining indoor humidity in the vehicle to be similar or equal to outdoor humidity.

Hereinafter, a method of calculating the evaporable water vapor amount $m_{vap}$ in the cathode 12 based on ambient air introduced through the second valve 30 will be described in detail. The evaporable water vapor amount $m_{vap}$ in the cathode 12 may be set as a target value to adjust the water vapor amount excluding condensate amount discharged through the outlet of the radiator 60 (e.g., the water vapor amount contained in air discharged through the first valve 20). The evaporable water vapor amount $m_{vap}$ in the cathode 12 may be calculated by Equation 1 below:

$$m_{vap} = m_{air} \times 0.622 \times \frac{\varphi_{air} \times P_{sat}(T)}{P_{total} - \varphi_{air} \times P_{sat}(T)} \quad \text{Equation 1}$$

$m_{air}$: provided air amount (proportional to air stoichiometric ratio, air SR)
$\varphi_{air}$: relative humidity (RH)
$P_{total}$: total pressure=air pressure+water vapor pressure
$P_{sat}$: saturated water vapor pressure (as a function of temperature alone)

As shown in Equation 1, variables to adjust the evaporable water vapor amount $m_{vap}$ include air amount supplied to the cathode 12 (is proportional to air SR), the total pressure in the cathode 12, relative humidity of ambient air, and the saturated water vapor pressure.

The cathode 12 of the stack 10 may be maintained in a state capable of readily evaporating water since sufficient heat is supplied to the cathode 12. Thus, air discharged from the cathode 12 may have relative humidity close to that of a saturated state. To adjust the internal temperature of the stack 10 to a target level, the evaporated amount of water in the cathode 12 may be adjusted through adjustment of the air amount introduced into the cathode 12 and the internal pressure of the cathode 12.

The variable to be ultimately adjusted in the fuel cell system 100 is the operation temperature of the stack 10. When the evaporated amount of water vapor in the cathode 12 and evaporative latent heat are not adjusted, the internal temperature of the stack 10 may increase since cooling of the stack 10 is not appropriately performed. Accordingly, the fuel cell system 100 according to the illustrated exemplary embodiment of the present invention may be configured to adjust the amount and pressure of air introduced into the cathode 12, thereby adjusting the evaporated amount of water vapor and evaporative latent heat in the stack 12 while maintaining the target temperature of the stack 10. In addition, the fuel cell system 100 may be configured to adjust the amount of radiant heat and pressure of the radiator 60 based on the evaporated amount of water vapor to maintain a constant water amount in the water reservoir 70.

Figure 2:
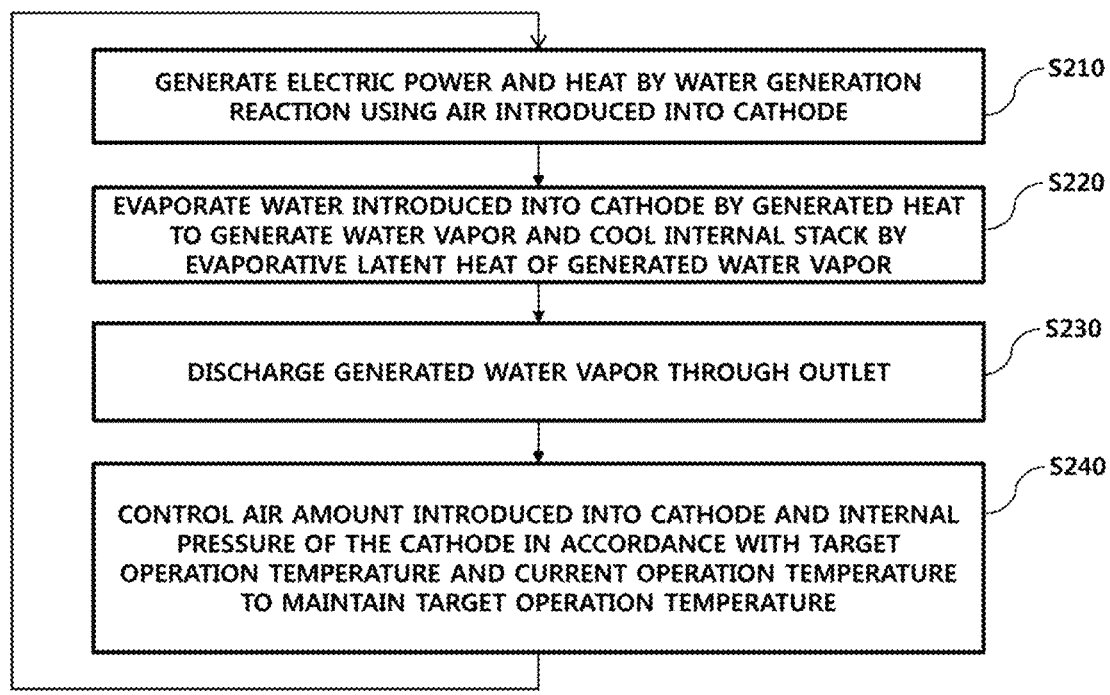
FIG. 2 is a flowchart illustrating a stack cooling control process in the fuel cell system according to an exemplary embodiment of the present invention.

FIG. 2 is a flowchart illustrating a stack cooling control process in the fuel cell system according to an exemplary embodiment of the present invention. In particular, FIG. 2 illustrates a process for adjusting an evaporated amount of water vapor in the cathode 12 of the stack 10 to maintain the target operation temperature.

In S210, electric power and heat are generated through water generation reaction using air introduced into the cathode. In S220, water supplied into the cathode is evaporated by generated heat to produce water vapor. Furthermore, an inner space of the stack is cooled by evaporative latent heat of the produced water vapor. In S230, water vapor may be discharged through the outlet provided at the cathode.

In S240, the amount of air introduced into the cathode and the internal pressure of the cathode may be adjusted based on the target operation temperature and the current internal temperature of the stack 10, thereby maintaining the target operation temperature of the stack. In S240, the amount air introduced into the cathode and the internal pressure of the cathode may be adjusted by operating at least one of the second valve 30, the first compressor 40 and the second compressor 50 in illustrated in FIG. 1.

Figure 3:
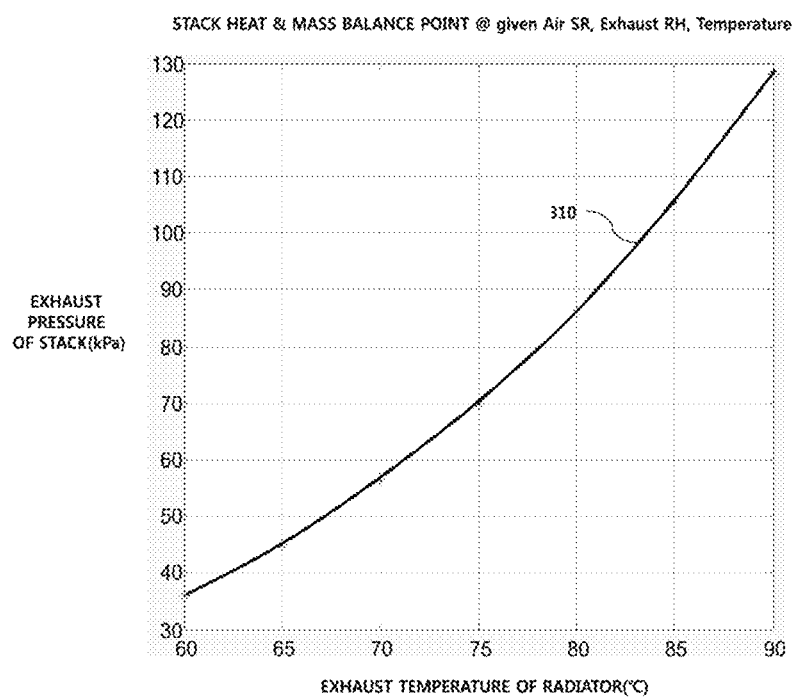
FIG. 3 is a graph illustrating an exhaust pressure limit of the stack based on an exhaust temperature of the stack in the fuel cell system according to an exemplary embodiment of the present invention.

FIG. 3 is a graph illustrating an exhaust pressure limit of the stack based on an exhaust temperature of the stack in the fuel cell system according to an exemplary embodiment of the present invention. As shown in FIG. 3, the exhaust pressure limit range according to the exhaust temperature of water vapor (e.g., normal operation range), for maintenance of the target operation temperature of the stack, may be defined by a right lower area with respect to a limit line 310. For example, referring to FIG. 3, when the exhaust temperature is about 80 degrees Celsius, a maximum exhaust pressure for normal operation of the stack may be equal to or less than about 86 kPa.

Figure 4:
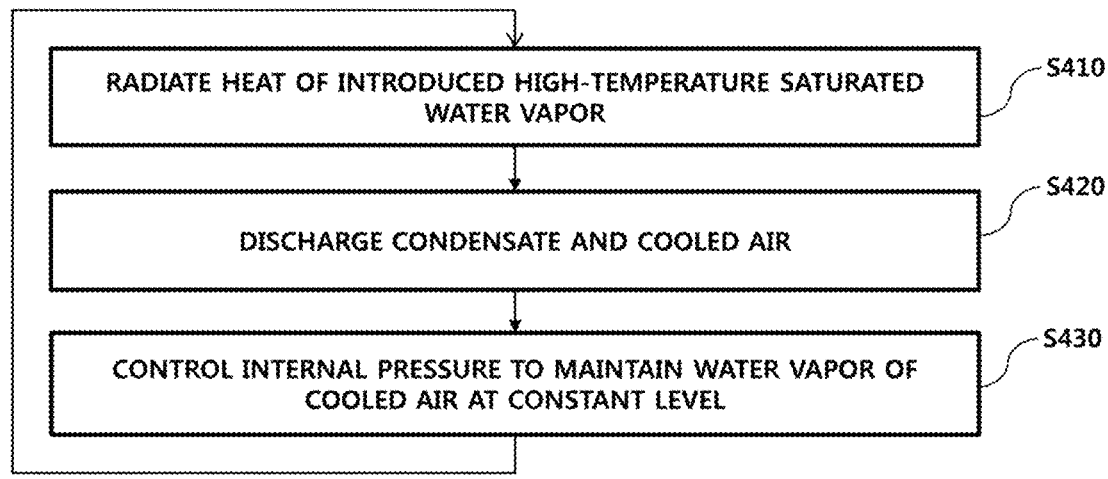
FIG. 4 is a flowchart illustrating a condensation control process in the radiator of the fuel cell system according to an exemplary embodiment of the present invention.

FIG. 4 is a flowchart illustrating a condensation control process in the radiator of the fuel cell system according to an exemplary embodiment of the present invention. Referring to FIG. 4, in S410, heat of introduced water vapor, which is high-temperature and saturated, may be radiated to ambient air.

In S420, condensate and cooled air generated through radiant heat may be discharged. In S430, the internal pressure of the radiator may be adjusted to maintain the vapor water amount contained in discharged cooled air at a predetermined level or greater. In S430, the internal pressure of the radiator may be adjusted by operating the first valve 20 and the second compressor 50 illustrated in FIG. 1.

Further, the amount water vapor contained in cooled air may be adjusted based on the amount of water vapor generated by water generation reaction in the cathode of the stack. In an exemplary embodiment, the amount water vapor contained in cooled air may be adjusted to be about the same as the amount of water vapor generated by water generation reaction. In another exemplary embodiment, the amount water vapor contained in cooled air may be adjusted to maintain water amount in the water reservoir 70 at the predetermined level or greater.

Figure 5:
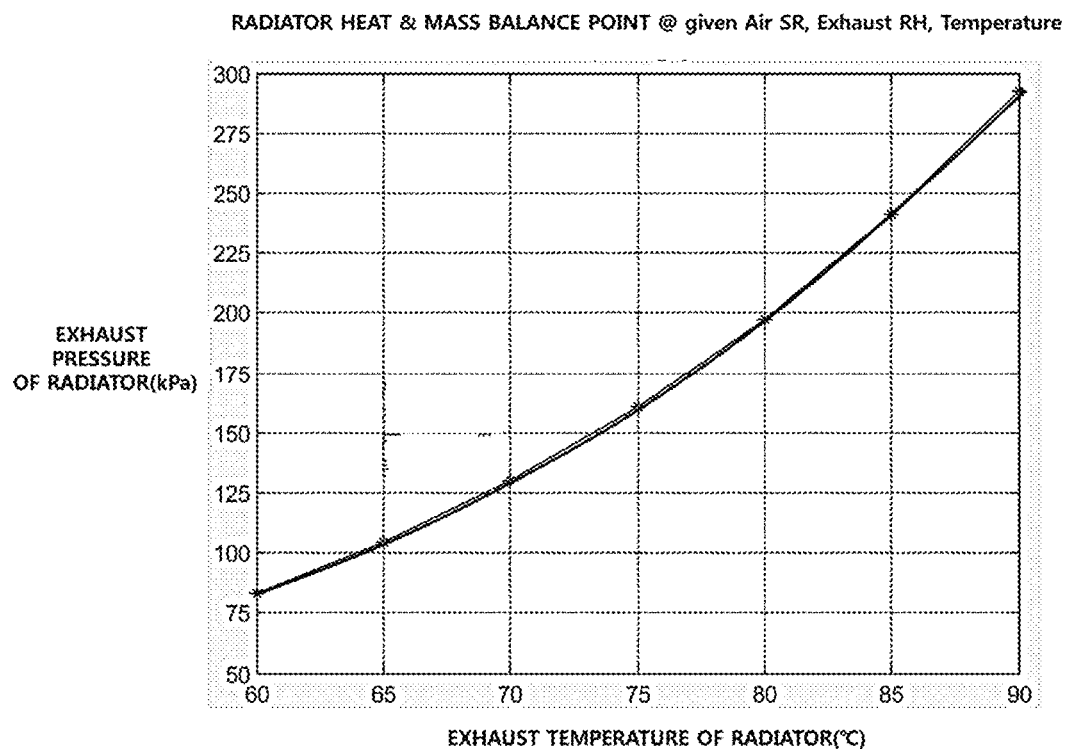
FIG. 5 is a graph illustrating an exhaust pressure limit of the radiator based on an exhaust temperature of the radiator in the fuel cell system according to an exemplary embodiment of the present invention.

FIG. 5 is a graph illustrating an exhaust pressure limit of the radiator based on an exhaust temperature of the radiator in the fuel cell system according to exemplary embodiment of the present invention. Referring to FIG. 5, an operable range of the radiator to condense and recover water necessary for cooling the stack may be defined by a left upper area with respect to a limit line 510. For example, when a discharge temperature of the radiator is about 80 degrees Celsius, a discharge pressure of the radiator may be maintained at least about 200 kPa or greater.

The amount of water vapor to be included in ambient air may be determined by four variables of air amount, air pressure, relative humidity and saturated water vapor pressure, as shown in Equation 1. In the radiator of the fuel cell system, the outlet, where condensation of water vapor is induced, may be in a nearly saturated state. Thus, the outlet pressure of the radiator may be adjusted by operating the first valve 20 and the second compressor 50 illustrated in FIG. 1.

When the outlet pressure 'P_total' of the radiator increases and the temperature of the radiator decreases (e.g., a decrease in Psat) through an external fluid, for example, air in the case of the vehicle, condensation in the radiator may be generated in accordance with a decrease in the water vapor amount to be included in air. In particular, discharged air reaches a dew point, and thus, relative humidity may be in a saturation level. Therefore, the amount of condensate may be adjusted by adjusting the outlet pressure of the radiator. As shown in FIG. 5, when the exhaust temperature of the radiator is decreased, the outlet pressure of the radiator may be decreased.

In particular, power consumed to operate the second compressor 50 illustrated in FIG. 1 may be reduced, thereby improving power efficiency of the fuel cell system. For high output, however, the exhaust temperature of the radiator may be increased due to a limit of the amount of radiant heat in the radiator 12. Accordingly, to recover a constant amount of condensate, the outlet pressure of the radiator may be increased. The amount of condensate may be flexibly adjusted based on a water storage capacity of the water reservoir 70.

Figure 6:
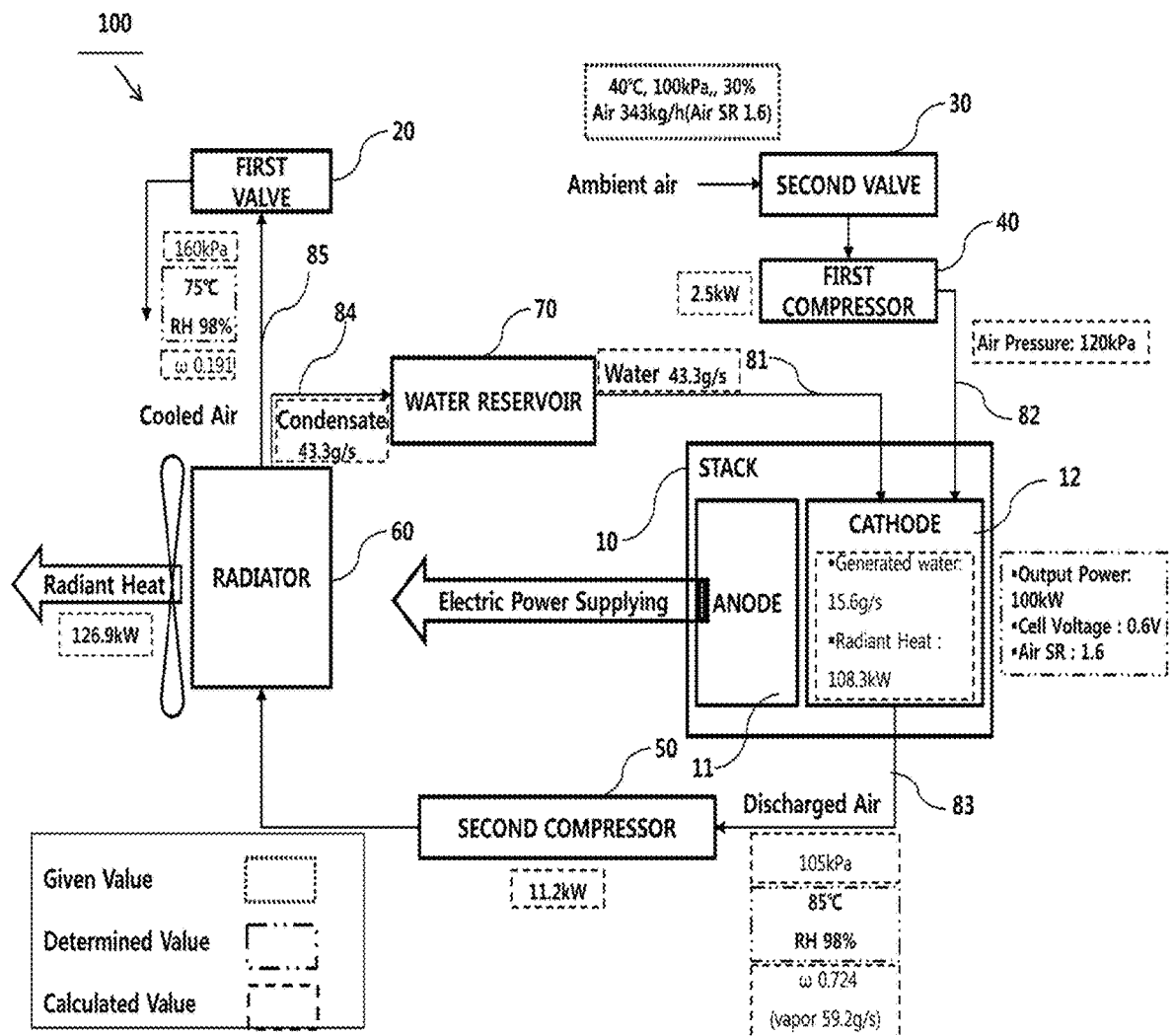
FIGS. 6 and 7 are diagrams illustrating exhaust pressure (or discharge pressure) characteristics based on exhaust temperatures (or discharge temperature) of the stack and radiator in the fuel cell system under specific operation conditions in accordance with an exemplary embodiment of the present invention.
Figure 7:
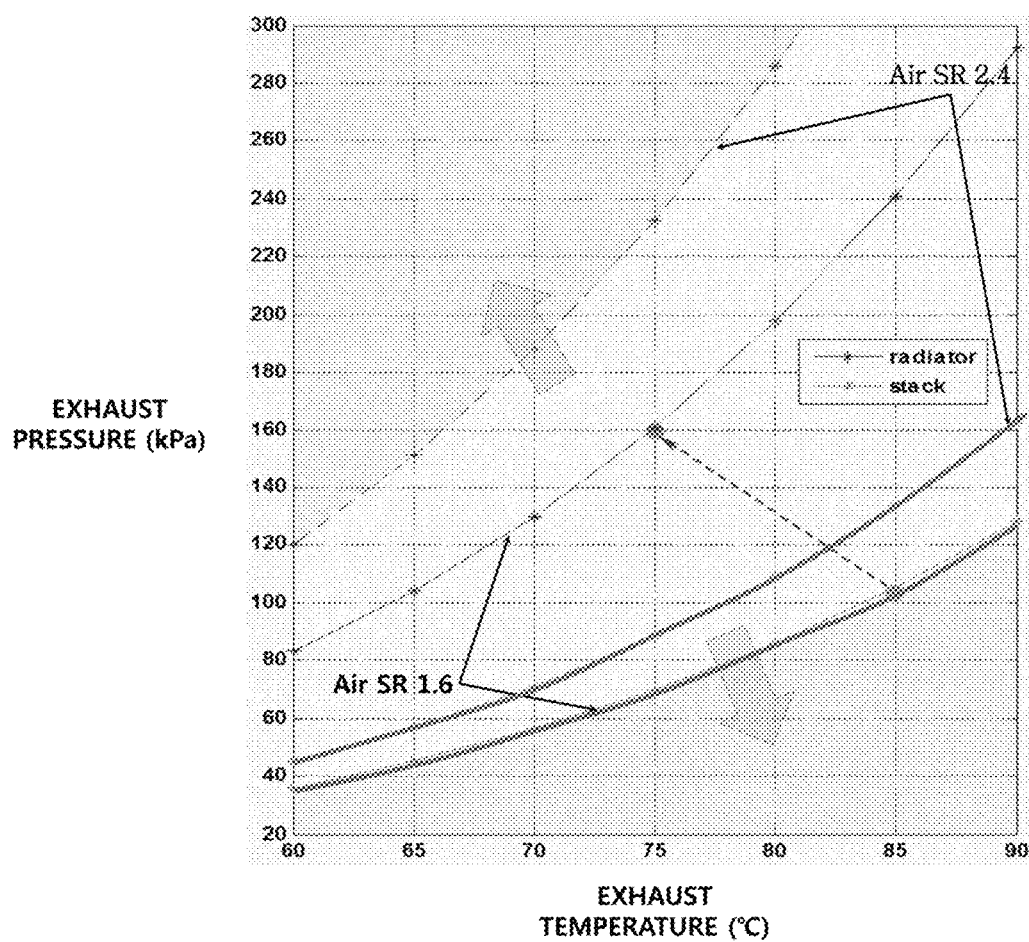

FIGS. 6 and 7 are diagrams illustrating exhaust pressure (or discharge pressure) characteristics based on exhaust temperatures (or discharge temperature) of the stack and radiator in the fuel cell system under specific operation conditions in accordance with an exemplary embodiment of the present invention. When operation conditions according to Table 1 below are applied in the fuel cell system 100 of FIG. 1, FIG. 6 shows input/output values of respective components of the fuel cell system.

TABLE 1

| Operation conditions | | | |
|---|---|---|---|
| Pe | 100 | kW | Output power of stack |
| Vcell | 0.6 | V | Average voltage of cell |
| SR_air | 1.6/2.4 | — | Air stoichiometric ratio (Air SR) |
| T_amb | 40 | ° C. | Ambient temperature |
| P_amb | 100 | kPa_a | Ambient pressure |
| RH_amb | 30 | % | Ambient relative humidity |
| P_Sin | 120 | kPa_a | Air pressure of stack inlet |
| RH_Sout | 98 | % | Stack outlet RH, desired value |
| RH_Rout | 98 | % | Radiator outlet RH, desired value |

The numerical values illustrated in FIG. 6 include given values, determined values and calculated values. For the operation conditions of Table 1, when discharge air in the outlet of the stack 10 is maintained at relative humidity of about 98%, the temperature of about 85 degrees Celsius, and the pressure of about 105 kPa, and when the temperature of the outlet of the radiator 60 is about 75 degrees Celsius and the exhaust pressure of the radiator is maintained at about 160 kPa, the amount of discharged condensate may be about 43.3 g/s and the amount of heat absorbed by air+water having evaporative latent heat of the cathode 12 may be about 108 kW. It may be seen that to cool the stack 10 and humidify internal air of the vehicle may be used. When the exhaust temperature of the radiator 60 is low due to low ambient temperature, the exhaust pressure of the radiator 60 may be low and air SR may be increased. In particular, since the operation pressure of the stack 10 may be maintained high, the entire fuel cell system may be operated efficiently.

FIG. 7 shows controllable exhaust pressure ranges according to exhaust temperatures of the stack and the radiator at air SRs of 1.6 and 2.4, respectively. As shown in FIG. 7, when air SR is increased from 1.6 to 2.4, the controllable exhaust pressure of the stack may be seen to be increased at the same exhaust temperature. Further, when air SR is increased from 1.6 to 2.4, the controllable exhaust pressure of the radiator may be seen to be increased at the same exhaust temperature.

Figure 8:
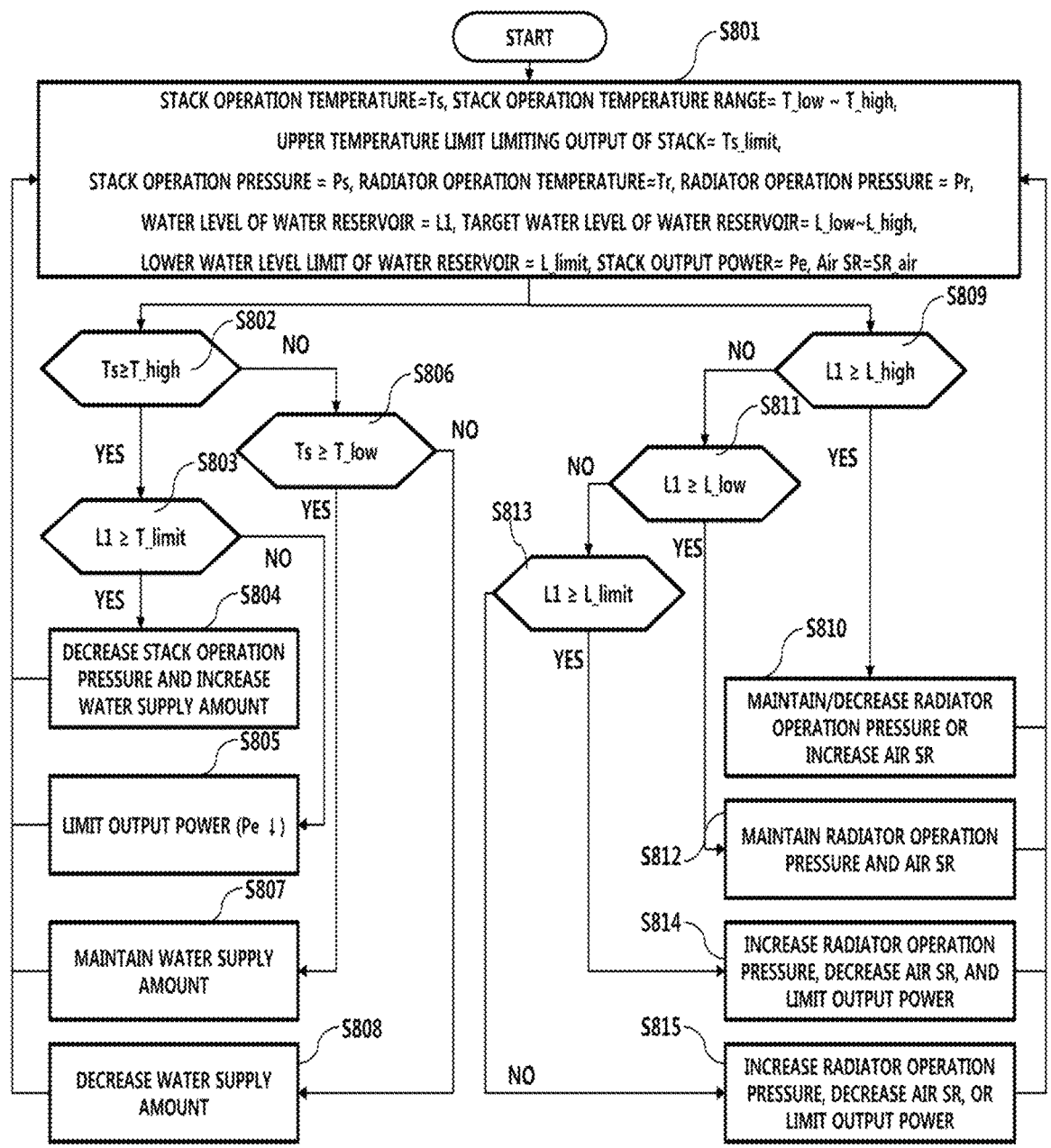
FIG. 8 is a flowchart illustrating a cooling control method in the fuel cell system according to an exemplary embodiment of the present invention.

FIG. 8 is a flowchart illustrating a cooling control method in the fuel cell system according to an exemplary embodiment of the present invention. Referring to FIG. 8, in the fuel cell system controller, control parameters necessary for a fuel cell system control may be predetermined (S801). Particularly, the predetermined control parameters may include a stack operation temperature Ts, a stack operation temperature range T_low to T_high (e.g., T_low being a lower temperature limit (e.g., about less than −30° C.) and T_high being an upper temperature limit (e.g., about 100-120° C.)), an upper temperature limit Ts_limit limiting output of the stack, a stack operation pressure Ps, a radiator operation temperature Tr, a radiator operation pressure Pr, a water level of the water reservoir L1, a target water level of the water reservoir L_low to L_high, a lower water level limit of the water reservoir L_limit, stack output power Pe, air stoichiometric ratio SR_air, and so on.

The fuel cell system controller may be configured to determine whether Ts is equal to or greater than T_high (S802). After determining Ts, when Ts is equal to or greater than T_high, the fuel cell system controller may be configured to determine whether L1 is equal to or greater than L_limit (S803). After checking L1, when L1 is equal to or greater than L_Limit, the fuel cell system controller may be configured to decrease the stack operation pressure Ps and increase injection amount of water supplied to the cathode of the stack (S804).

In S803, when L1 is less than L_limit, the fuel cell system controller may be configured to limit the stack output power Pe (S805). Further, after detecting Ts in S802, when Ts is less than T_high, the fuel cell system controller may be configured to detect whether Ts is equal to or greater than T_low. After detecting Ts, when Ts is equal to or greater than T_low, the fuel cell system controller may be configured to maintain the injection amount of water supplied to the cathode of the stack (S807).

Alternatively, when Ts is less than T_low, the fuel cell system controller may be configured to decrease the injection amount of water supplied to the cathode of the stack (S808). S802 to S808 are associated with a method of optimizing system efficiency by adaptively adjusting the injection amount of water supplied to the cathode of the stack and the pressure in the cathode based on the stack operation temperature. S809 to S814 of FIG. 8 to be described below are associated with a method of maintaining the target level of water necessary to cool the stack in the water reservoir by adaptively adjusting the operation pressure of the radiator and air SR.

The fuel cell system controller may be configured to detect whether L1 is equal to or greater than L_high (S809). After detecting L1, when L1 is equal to or greater than L_high, the fuel cell system controller may be configured to maintain or decrease the operation pressure of the radiator (S810). Further, when L1 is equal to or greater than L_high, the fuel cell system controller may be configured to increase air SR. The fuel cell system controller may be configured to detect whether L1 is less than L_high and is equal to or greater than L_low (S811).

After detecting L1, when L1 is less than L_high and L1 is equal to or greater than L_low, the fuel cell system controller may be configured to maintain the current operation pressure of the radiator and current air SR in S812. When L1 is less than L_low, the fuel cell system controller may be configured to detect whether L1 is equal to or greater than L_limit (S813). After detecting L1, when L1 is equal to or greater than L_limit, the fuel cell system controller may be configured to increase the operation pressure of the radiator, namely, the exhaust pressure of the radiator, while decreasing air SR (S814). Alternatively, the fuel cell system controller may be configured to limit output power to generate the increased condensate in the radiator. After the detecting result of S813, when L1 is less than L_limit, the fuel cell system controller may be configured to increase the radiator operation pressure to generate an increased amount of condensate and to decrease air SR (S815). In another exemplary embodiment, the fuel cell system controller may be configured to limit output power of the stack.

The cooling control method for the fuel cell system in accordance with the exemplary embodiment disclosed herein may be embodied as non-transitory computer readable media on a computer readable medium containing executable program instructions executed by a processor, controller or the like. Examples of the computer readable media include, but are not limited to, read only memory (ROM), random access memory (RAM), magnetic tapes, flash memory, optical data storage devices and so on. The computer readable recording medium can also be distributed over network coupled computer systems so that the computer readable media is stored and executed in a distributed fashion.

As is apparent from the above description, a method and a device in accordance with the exemplary embodiments have the following effects. Exemplary embodiments of the present invention advantageously provide an evaporative cooling type fuel cell system and a cooling control method for the same. In addition, exemplary embodiments of the present invention advantageously provide a fuel cell system, which may simplify configuration of the conventional evaporative cooling type fuel cell system, thereby reducing manufacturing costs and being decreased in size and lightweight. In addition, exemplary embodiments of the present invention advantageously provide a fuel cell system, which may adaptively adjust the amount and pressure of air in a cathode and the amount of condensate, thereby maximizing efficiency of the fuel cell system.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A fuel cell system comprising a stack to generate electric power by reacting hydrogen as fuel with air as an oxidant, comprising:
   a first valve configured to exhaust air from the fuel cell system;
   a second valve configured to adjust an amount of air supplied to a cathode of the stack;
   a first compressor configured to adjust a pressure of air introduced into the second valve to supply air to the stack;
   a second compressor configured to adjust a pressure of air exhausted from the stack;
   a radiator configured to radiate heat of the exhausted air transferred from the second compressor to generate condensate to be supplied to the stack and air to be exhausted by the first valve; and
   a water reservoir configured to store condensate to be supplied to the stack,
   wherein the fuel cell system decreases an operation pressure of the stack and increases an amount of water supplied to the stack when a current operation temperature is equal to or higher than a predetermined upper operation temperature limit of the stack and a water level of the water reservoir is equal to or higher than a predetermined lower water level limit of the water reservoir.

2. The fuel cell system according to claim 1, wherein at least one of the second valve and the first and second compressors is configured to adjust an operation pressure of the stack.

3. The fuel cell system according to 1, wherein an amount of the condensate generated in the radiator is controlled by adjusting an operation pressure of the radiator.

4. The fuel cell system according to claim 3, wherein the operation pressure of the radiator is adjusted by operating at least one of the second compressor and the first valve.

5. The fuel cell system according to claim 1,
   wherein at least one from the group consisting of: an operation pressure of the stack, an operation pressure of the radiator, and an air stoichiometric ratio (SR) that corresponds to air amount supplied to the cathode is dynamically adjusted, to maintain the water level of the water reservoir in a range of a predetermined target water level.

6. The fuel cell system according to claim 5, wherein an output power of the stack is limited when the water level of the water reservoir is equal to or less than the range of the predetermined target water level.

7. The fuel cell system according to claim 1, wherein operation pressures of the stack and radiator are dynamically adjusted based on desired output power of the stack.

8. The fuel cell system according to claim 1, wherein at least one selected from the group consisting of: air amount, an operation pressure of the stack, and an operation pressure of the radiator are dynamically adjusted, to minimize power consumed by the first and second compressors and to maximize output power of the stack.

* * * * *